United States Patent [19]

Millar

[11] 4,391,292
[45] Jul. 5, 1983

[54] FAST-RESPONSE THREE-WAY SOLENOID VALVE

[75] Inventor: Robert W. Millar, San Diego, Calif.

[73] Assignee: Orshansky Transmission Corporation, New York, N.Y.

[21] Appl. No.: 172,661

[22] Filed: Jul. 28, 1980

Related U.S. Application Data

[63] Continuation-in-part of Ser. No. 159,469, Jun. 16, 1980, abandoned.

[51] Int. Cl.³ ............................................. F15B 13/044
[52] U.S. Cl. ............................... 137/269; 137/596.17; 137/870; 251/129; 335/262
[58] Field of Search ............. 91/459; 137/269, 596.17, 137/870; 251/129; 335/262

[56] References Cited

U.S. PATENT DOCUMENTS

| 2,200,830 | 5/1940 | Beharrell et al. | 137/596.1 |
| 3,229,588 | 1/1966 | Czernek | 137/625.65 X |
| 4,063,568 | 12/1977 | Sosulnikov et al. | 137/596 X |
| 4,153,890 | 5/1979 | Coors | 335/262 X |
| 4,286,626 | 9/1981 | Leiber | 251/129 X |
| 4,301,715 | 11/1981 | Acar | 137/596.17 X |

FOREIGN PATENT DOCUMENTS

| 1140394 | 7/1957 | France | 251/129 |
| 737494 | 9/1955 | United Kingdom | 137/625.65 |

Primary Examiner—Gerald A. Michalsky
Attorney, Agent, or Firm—Owen, Wickersham & Erickson

[57] ABSTRACT

A fast-response three-way solenoid valve. A housing has three openings interconnected by a linear fluid pathway, with two chambers each disposed between two openings and having at least one valve seat per chamber. In each chamber a ball is movable toward and away from a valve seat to open and to close off the flow of fluid there. A separator pin is disposed, with clearance, within the linear pathway between the two chambers and bearing against both balls; when one ball is seated against its seat, the other ball is away from its seat. A solenoid has a plunger which moves upon energization of the solenoid, and a guide passage between the plunger and one chamber is aligned with both chambers and the balls. A plunger pin disposed in the guide passage bears against one ball on the side thereof opposite to the separator pin; the other end of the plunger pin bears against the plunger when the solenoid is energized. Movement of the plunger upon the energization of the solenoid causes the plunger to contact and move the plunger pin, in turn moving the balls and their separator pin, so that one ball is seated when the solenoid is energized, and the other ball is seated when the solenoid is de-energized.

21 Claims, 10 Drawing Figures

FAST-RESPONSE THREE-WAY SOLENOID VALVE

REFERENCE TO RELATED APPLICATION

This application is a continuation-in-part of application Ser. No. 159,469, filed June 16, 1980, now abandoned.

BACKGROUND OF THE INVENTION

This invention relates to improvements in three-way solenoid valves for controlling the flow of a fluid. Such valves are used to direct the flow of fluid along one pathway when the solenoid is actuated or energized, and along another pathway when it is not actuated or is de-energized.

Typically, such valves have required springs and internal working seals, and they have been neither compact nor readily modifiable.

Heretofore, it has been necessary to design and construct normally open solenoid valves differently from normally closed valves. Such differences have required that almost every part for the normally open valve be different from the generally corresponding part of the normally closed valve, thus requiring that greater inventories of parts be kept on hand for manufacturing the actual valves.

The present invention solves these problems by providing solenoid valves of both normally open and normally closed types, in which most of the parts are identical and which may be readily converted to one or the other, all without otherwise altering the physical or operational characteristics of the valve in either form. Furthermore, the modification of the valve is done without significant expense of time or resources.

The valve of the present invention may be employed wherever a three-way solenoid valve is needed. For example, it has been found a useful component in a hydromechanical transmission, such as the one described in U.S. Pat. Nos. 4,008,628 and 4,134,311. There, this valve may be used to control the flow of hydraulic fluid into a hydraulic cylinder which engages various parts of the transmission and directly varies vehicle speed. Release of the fluid from the hydraulic cylinder is also controlled by the valve.

OBJECTS OF THE INVENTION

It is an object of the invention to provide a solenoid-operated three-way cartridge valve wherein no modification of the major parts is required to convert a normally open valve to a normally closed valve and vice versa.

Still another object of the invention is to provide a valve wherein all valve seats can be cut with a common tool, and which has small parts that can be adaptable to screw machine manufacturing, it being important that such valve be economical to produce and use.

Another object of the invention is to provide a fast acting solenoid-operated three-way cartridge valve which is compact and does not require internal working seals or springs.

A further object of the invention is to provide a solenoid-operated three-way cartridge valve wherein substantially all parts and operations in the valve and the solenoid are identical for both the normally open and the normally closed configurations, and the non-identical parts may readily be made from identical stock.

SUMMARY OF THE INVENTION

The present invention comprises a solenoid-operated three-way cartridge valve for controlling the flow of a fluid between three openings. The valve has two operating positions; one enabling flow between the first opening and the second opening, and another which enables fluid flow between the second opening and the third opening. Two forms of the invention are provided, and the valve is readily convertible from one form to the other: a first, normally open solenoid valve in which fluid flow is directed between the third opening and the second opening when the solenoid is unactuated, and a second, normally closed solenoid valve in which fluid flow is directed between the second opening and the first opening when the solenoid is unactuated. In both forms the alternate operating position is achieved when the solenoid is actuated. Both forms employ the same overall design of a linear axial fluid passageway with two ball valves separated by a pin, with one opening between the valves and the other two openings at the opposite ends of the valve.

An important difference between the two forms is the length of the separator pin between the ball valves and the length of the plunger pin which connects the solenoid to the valve mechanism. Both of these parts may be cut to the desired length from thick wire stock. Each ball valve is situated in a chamber disposed along the axial fluid passageway. At least one and preferably each end of each chamber is made so that it can act as a valve seat against which the ball may be seated to stop the flow of fluid. Pin lengths are selected so that when one ball valve is closed, the other will be open. The sides of the chambers which are used as the valve seats, along with the pin sizes, determine which form of valve, normally open or closed, has been made.

The solenoid of the invention may comprise either a single unit attached to the body section of the valve, or may employ a mounting cap. In both forms, an annular extension, having threading reciprocal with threads on the body section of the valve, protrudes from the solenoid portion. A plunger spacer may be employed to fix the distance of an air gap between the solenoid plunger and the guide for the plunger pin.

DESCRIPTION OF THE PREFERRED EMBODIMENTS

The normally closed valve 15 of FIGS. 1 to 6

Figure 1:
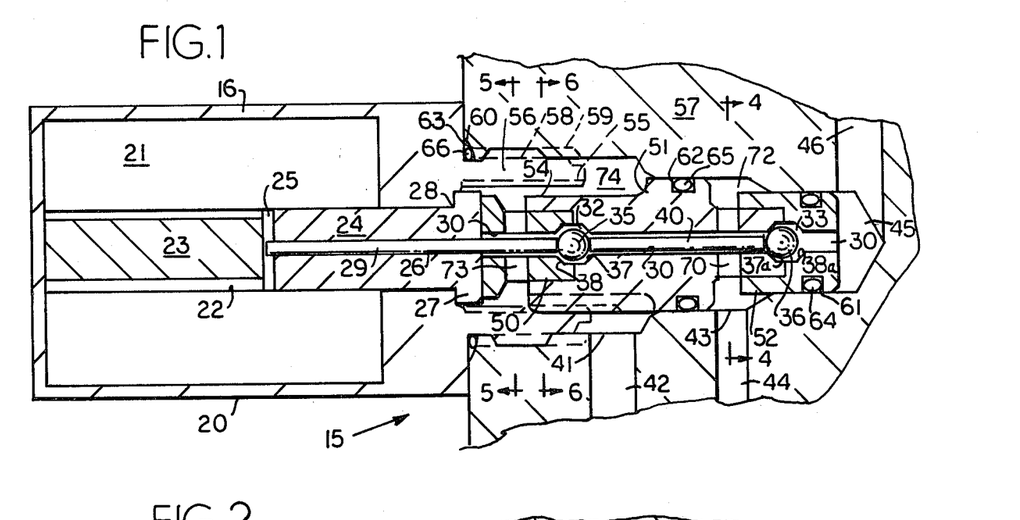
FIG. 1 is a view in section of a normally closed solenoid valve embodying the principles of the invention, the valve being shown in the unactuated state. Portions of a housing have been broken off to conserve space.
Figure 2:
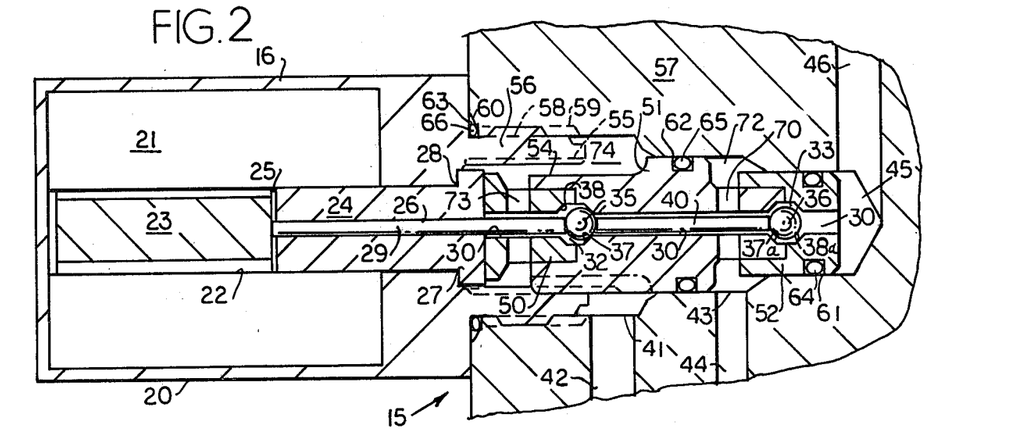
FIG. 2 is a similar view of the valve of FIG. 1 shown in its actuated state, with the solenoid energized.

FIGS. 1 and 2 show a normally closed valve 15 embodying the principles of the invention. A casing 16 houses a solenoid 20 having a coil 21 (shown only as an area), a central passage 22, and a plunger 23 disposed in the central passage 22. A guide plug 24 is seated in the passage 22 adjacent to but spaced apart from the plunger 23. When the solenoid 20 is de-energized, a space 25 between the plunger 23 and the guide plug 24 is at least the length of the stroke of the plunger 23. The guide plug 24 has an axial guide passage 26 therethrough and has a head 27 that bears against a shoulder 28 of the passage 26.

The solenoid 20 acts on the valve mechanism via a plunger pin 29 which is slidably disposed in the guide passage 26, extending beyond the guide plug 24 in a lost-motion connection with the plunger 23. The plunger pin 29 also extends beyond the head 27 into an axial linear fluid passageway 30 disposed in a body portion 31 of the valve 15. Also disposed within the passageway 30 are first and second ball valve chambers 32 and 33 which respectively house first and second balls 35 and 36. At least one end, and preferably both ends, of the chamber 32 are usable as a valve seat 37 or 38 against which the ball 35 may be sealingly engaged by pressure from fluid flow or force from solenoid energization applied to the ball 35, to stop the flow of fluid past the valve seat 37 or 38 and through the chamber 32.

The side of the first chamber 32 which is opposite the plunger pin 29 is the first inner or normally closed valve seat 37 and the other side of the first chamber 32 is the first outer or normally open valve seat 38, not employed as a seat in this normally closed mode. Similarly, the side of the second chamber 33 which is nearer the first chamber 32 is a second inner or normally closed valve seat 37a, and the other side of second chamber 33 is a second outer or normally open valve seat 38a.

Disposed between the balls 35 and 36 in the passageway 30, with sufficient clearance to permit fluid flow, is a separator pin 40 which bears against both of the balls 35 and 36. The plunger pin 29 extends from the guide passage 26 into the passageway 30 to bear against the side of the first ball 35 which is opposite to the separator pin 40.

The valve 15 has three openings interconnected within the body portion 31 via the axial passageway 30. For example, when the valve 15 is used in a hydromechanical transmission, a first opening 41 leads to a vent line 42; a second opening 43 leads to a cylinder line 44; and a third opening 45 leads to a supply line 46. While the three-way valve 15 itself has many uses, it will be described here as it is used with such a hydromechanical transmission; this example is used for illustrative purposes only. The valve itself and the inventive principle behind it are applicable to many situations where flow-control of a fluid between three areas is needed.

Figure 3:
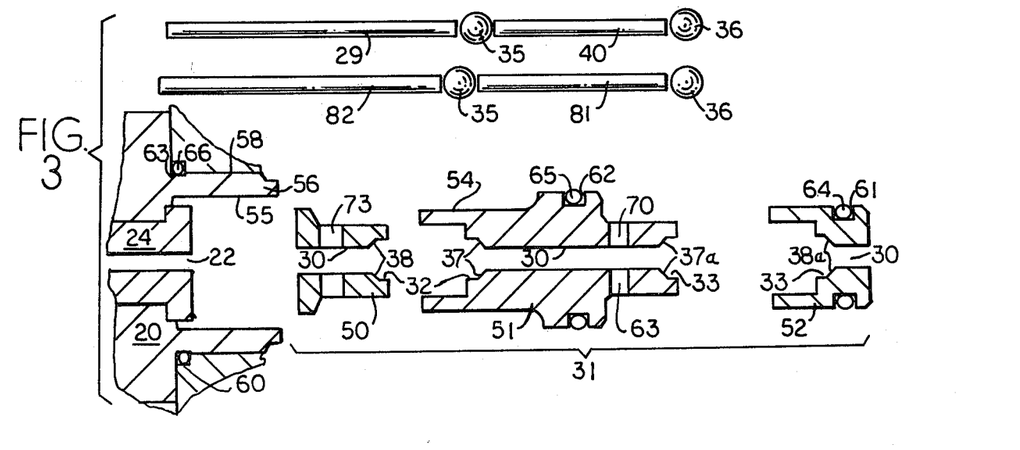
FIG. 3 is an exploded view in section of the unassembled body portion and movable portions of the valve of FIGS. 1-8; the movable portions are shown for both a normally open valve and a normally closed valve.

Referring to FIG. 3, the body portion 31 comprises three sections that are press-fit together in the assembled valve; a first or solenoid-end section 50, a second or center section 51, and a third or supply-end section 52. For manufacturing purposes, simple drilling operations can be used to provide each section 50, 51, and 52 with its portion of the passageway 30 and its portion of the ball chambers 32, 33. An equal widening of the passageway 30 at the press-fit ends of each body section 50, 51, 52, similar to the bore for counter-sinking a screw, is made to provide the chambers 32 and 33 for the balls 35 and 36. The slanted portion of the widened drill hole acts as a valve seat in the assembled product; the widened portion in the center press-fit section 51 becomes the internal valve seats 37 and 37a and the widened portion in the end press-fit sections 50 and 52 becoming the external valve seats 38 and 38a.

Once the body portion 31 has been assembled, it is attached to the solenoid 20. For this purpose the center body section 51 has external screw threads 54 which are adapted to mate with internal screw threads 55 on an annular extension 56 of the solenoid 20. Then, in the transmission example as shown in FIG. 1, the entire assembly 15 is attached to the transmission housing 57 by external screw threads 58 on the solenoid extension 56 which mate with internal screw threads 59 around the receiving opening 60, in the transmission block or other mechanism where the valve 15 is to be located. The supply-end body section 52, center body section 51, and solenoid annular extension 56 are all provided with respective external grooves 61, 62, 63 for receiving respective O-rings, 64, 65, 66 which act as external seals when the solenoid valve 15 is fully assembled and in place in the housing 57.

Figure 4:
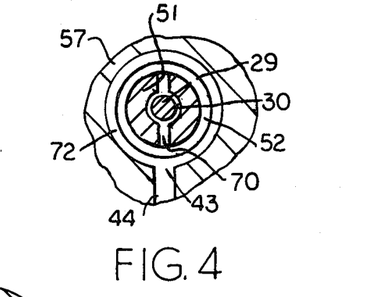
FIG. 4 is a fragmentary view in section taken along line 4—4 in FIG. 1.

Referring to FIG. 4, the passageway 30 is connected to the second opening 43 and the cylinder line 44 by a cross pathway 70 through the center body section 51. The second ball 36 is not shown. Surrounding the center body section 51 is a channel 72 to the second opening 43, through which the hydraulic fluid passes to and from the cylinder line 44. The supply end body section 52 is shown surrounding the portion of center body section 51 which extends beyond the cross channel 70.

Figure 5:
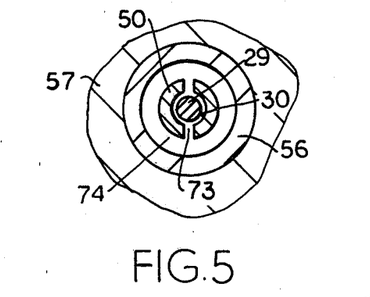
FIG. 5 is a fragmentary view in section taken along line 5—5 in FIG. 1.
Figure 6:
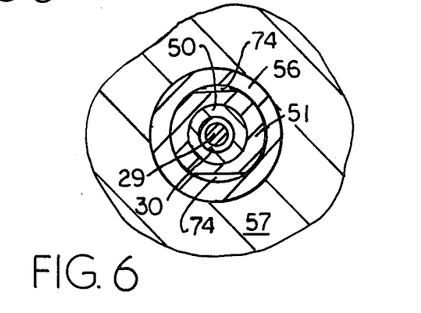
FIG. 6 is a fragmentary view in section taken along line 6—6 in FIG. 1.

FIG. 5 illustrates that a similar cross pathway 73 is provided through the solenoid-end body section 50 to connect the passageway 30 to the first opening 41 and the vent line 42. For purposes of use in a transmission, the first opening 41 and the vent line 42 should be disposed toward the center body section 51 as opposed to being disposed directly in line with the cross pathway 73 in the solenoid-end body section 50. This is to facilitate attachment by screw threads, as illustrated. Therefore, as shown in FIG. 6, a portion of the solenoid side of the center body section 51 is flattened on the top and on the bottom to provide a channel 74 from the cross pathway 73 in the solenoid-end body section 50 to the first opening 41 without interfering with the screw thread attachment 58 and 59 of the body section 31 to the solenoid annular extension 56.

In the unactuated or de-energized state for the normally closed form 15 as shown in FIG. 1, the fluid pressure from the supply line 46 will act on the second ball 36, closing it against the second inner valve seat 37a in the second chamber 33. When the normally closed valve 15 is energized the first ball 35 sealingly rests against the valve seat 37. Thus, in this embodiment the seats 37 and 37a are the ones utilized for closure or sealing, and they lie at opposite ends of the separator pin 40. When moving the second ball 36 against its seat 37a the fluid pressure from the supply line 47 against the second ball 36 also moves the separator pin 40, which, in turn, moves the first ball 35 away from its valve seat 37 in the chamber 32, thereby enabling flow from the cylinder line 44 through the passageway 30 to the vent line 42. The plunger pin 29, due to its placement against the first ball 35 will be simultaneously moved into the space 25 between the guide plug 24 and the plunger 23. The fluid flow from the cylinder line 44 to the vent line 42 will act on the first ball 35 tending to move it towards its outer seat 38 and to seal the first chamber 32, if not prevented. Therefore the plunger pin 29 is adapted to prevent the first ball 35 from sealing against the valve seat 38 of the first chamber 32 by being long enough to maintain contact with the plunger 23 and stop the movement of the first ball 35 before it is seated.

When the solenoid 20 is energized, the plunger 23 will be moved into the space 25, in turn moving the plunger pin 29, the first ball 35, the separator pin 40, and the second ball 36, thereby moving the second ball 36 away from its valve seat 37a and simultaneously causing the first ball 35 to rest sealingly against its valve seat 37. In this actuated state, flow from the cylinder line 44 to the vent line 42 will be cut off at the first ball 35 and the fluid can flow from the supply line 46 to the cylinder line 44, as shown in FIG. 2.

Figure 7:
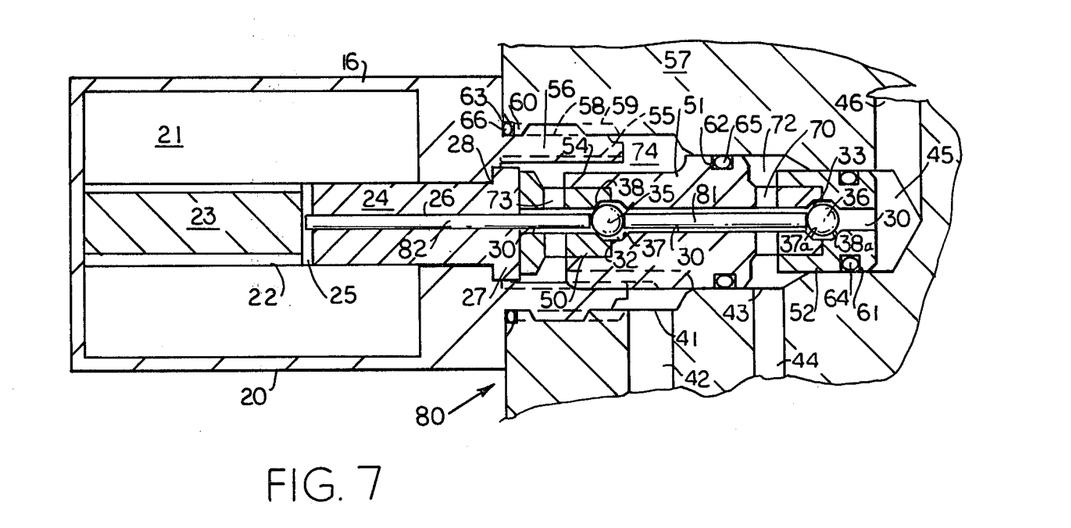
FIG. 7 is a view in section like FIG. 1 of a normally open valve also embodying the principles of the invention, with the valve being shown in its unactuated state.
Figure 8:
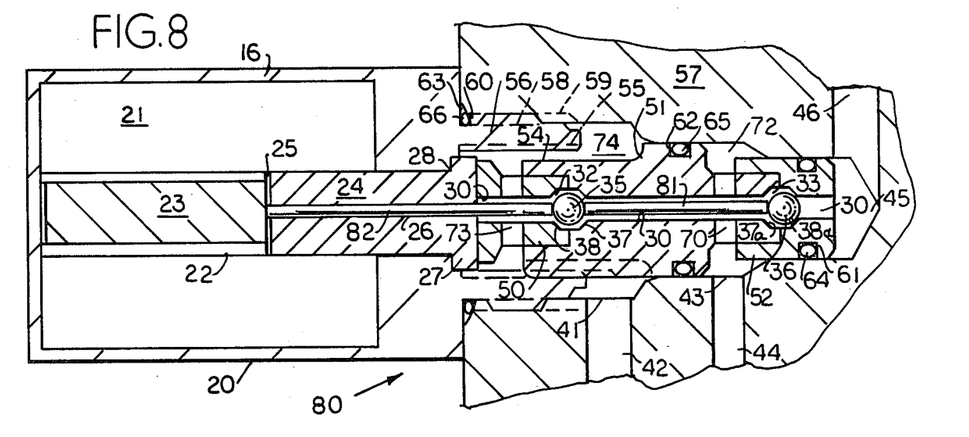
FIG. 8 is a similar view of the valve in FIG. 7 shown in its actuated state, with the solenoid energized.
Figure 9:
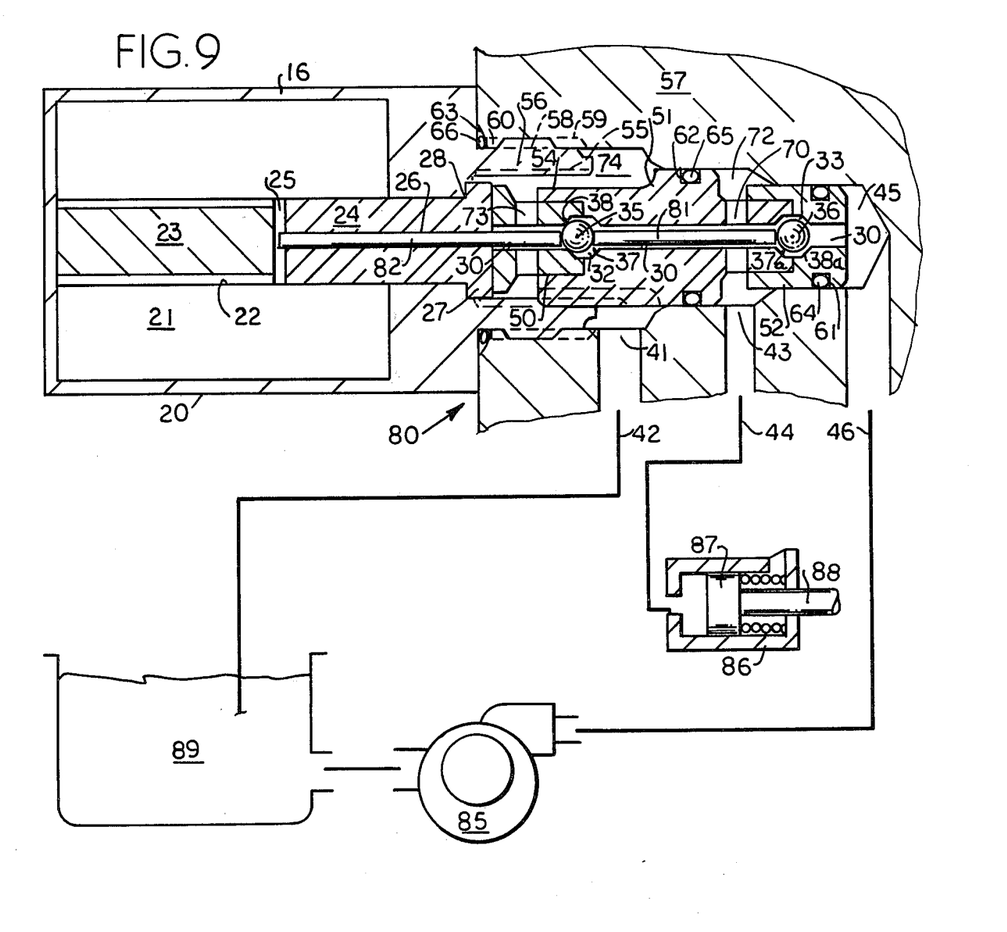
FIG. 9 is a similar view of the valve in FIG. 7 incorporated in a schematically shown hydraulic circuit.

The normally closed valve 80 of FIGS. 7-9

Referring to FIG. 7, a normally open valve 80 is shown. This valve 80 is almost identical to the normally closed valve 15, but has three principal differences. Its separator pin 81 is longer than the separator pin 40 of the normally closed valve 15, because the balls 35 and 36 in the valve 80 sealingly rest against the external valve seats 38 and 38a on the sides of the chambers 32 and 33 which are opposite the separator pin 81 in the normally open valve 80. For this reason, its plunger pin 82 is shorter in the normally open valve to permit the first ball 35 to be seated against the external valve seat 38 when the solenoid 20 is de-energized, whereas in the normally closed form 15 the plunger pin 29 is designed to be long enough to prevent sealing contact at this external side of first chamber 32. The relative proportions between the separator pins 40 and 81 and plunger pins 29 and 82 may be seen in FIG. 3.

Thus, as may be seen in FIG. 7, in its unactuated state the normally open valve 80 enables flow from the supply line 46 to cylinder line 44. In the energized or actuated state, the normally open valve 80 closes off flow from the supply line 46 and enables flow from the cylinder line 44 to the vent line 42, as shown in FIG. 8. It may, therefor be seen that with the precise yet simple physical modifications of the invention, both normally open 80 and normally closed 15 configurations are achievable from the same basic valve structure.

The normally closed valve 15 and the normally open valve 80 may thus both use the identical solenoid 20 with all its parts unchanged except for the plunger pin 29 or 82. In the body section 31, they may both use the identical valve parts 50, 51, and 52 and the same balls 35 and 36; only the separator pin 40 or 81 is different.

In the normally closed valve 15, the length of the separator pin 40 is approximately equal to or slightly greater than the distance between the two interior seats 37 and 37a, the segments of each ball 35 or 36 that enters the passageway 30 when it is seated being enough to assure unseating of the opposite ball, preferably urging it to the center of the chamber 32 or 33.

In the normally open valve 80, the length of the separator pin 81 is greater in length than the passageway 30 by an amount necessary to seat one ball against its exterior seat 38 or 38a while preventing the other ball from then being seated, preferably holding it in the center of the chamber 32 or 33.

The plunger pin 29 in the normally closed valve 15 is long enough so that it will seat the ball 35 against the seat 37 when the solenoid is energized and short enough so that it will not prevent unseating of that ball when the solenoid is de-energized.

The plunger pin 82 of the normally open valve 80 is short enough so that the ball 35 can seat fully against its seat 38 when the valve 80 is de-energized, and is long enough so that it unseats that ball 35 when the solenoid 20 is energized, but not so long as to seat it against the seat 37.

The separator pins 40 and 81 may both be cut-off lengths of the same wire stock. They should be thick enough to be stiff and give good engagement with the balls and not to be too loose in the passageway 30, yet small enough to provide adequate flow area in the passageway 30. Similarly, the plunger pins 29 and 82 may be cut-off lengths of a suitable wire stock. If desired, the valves may be so designed that the same wire stock can be used for both the separator pins 40 and 81 and the plunger pins 29 and 82. This is not necessary however, for often one should be thicker than the other.

Referring to FIG. 9, the normally open valve 80 is shown schematically as it would be connected in a circuit with a hydraulic automatic transmission 57. A pump 85 feeds hydraulic fluid via the supply line 46 through the third opening 45 into the passageway 30. The supply pressure forces the first ball 35 against its seat 38, shutting off flow to the vent line 42 when the valve is in the unactuated or de-energized state. The pressurized hydraulic fluid passes through the second opening 43 and the cylinder line 44 to fill a cylinder 86 causing it to move its piston 87 and its piston rod 88 to extend. Upon actuation of the solenoid 20, the plunger pin 82 moves the first ball 35 away from its seat 38 and at the same time, via the separator pin 81, moves the second ball 36 against its valve seat 38a. Such activation stops the flow of hydraulic fluid through the second chamber 33, allowing the pressure which has built up in the hydraulic cylinder 86 to be relieved back through the cylinder line 44, through the passageway 30, and out to the first opening 41 through the cross pathway 73, the channel 74 and the vent line 42 to a tank or reservoir 89, enabling the rod 88 to return to its unextended position. The tank 89 is connected to the feed pump 85, thereby forming a closed circuit through the valve 80. For pneumatic applications the vent line 42 would lead to the atmosphere and the pump 85 would be replaced by an air pump.

Figure 10:
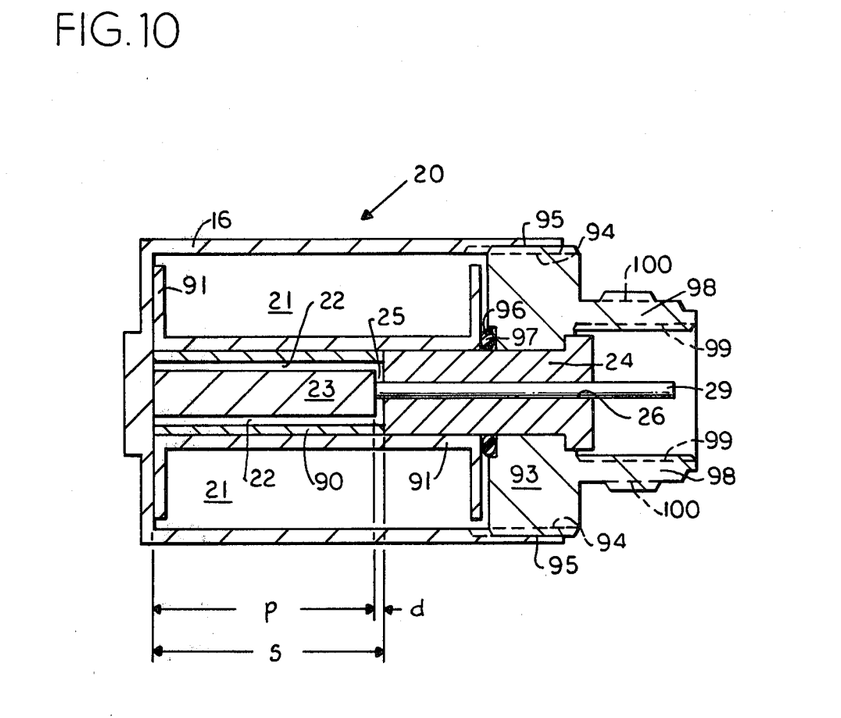
FIG. 10 is a view in section of a preferred solenoid construction of the invention, the solenoid being shown in its de-energized position.

In one preferred embodiment, illustrated in FIG. 10, the solenoid 20 further includes a plunger spacer 90 disposed between a coil spool 91 and the central passage 22. The plunger spacer 90 extends from the end of the housing 16 to the beginning of the plunger pin guide plug 24, thereby controlling the maximum air gap 25 between the plunger 23 and the guide plug 24. The maximum air gap 25 will therefore be the difference d between the plunger length p and the spacer length s. The spacer 90 should be made of non-magnetic material.

A further preferred embodiment of the solenoid 20 includes a mounting cap 93 having a central axial passage into which the guide plug 24 is inserted. The mounting plug has external screw threads 94 which mate with reciprocal internal screw threads 95 on a portion of the solenoid housing 16 which extends beyond the coil spool 91. A recess 96 and a compliant spacer 97 such as an O-ring are provided to take up clearance between the coil spool 91 and the mounting cap 93. This enables control of the dimensions if the plunger 23, spacer 90, and air gap 25 within 0.001, 0.001, and 0.002 inches respectively. Other dimensions which locate the coil 21 do not require such close tolerances, and the variation in the dimensional stackup is taken up by the compliant spacer 97. Use of the mounting cap 93 also simplifies manufacture and assembly of the valve 15, since the mounting cap is provided with an annular extension 98 having internal threading 99 reciprocal with the external threading 54 on the center body section 51, and has external threading 100 which mates with internal screw threads 59 around the receiving opening 60 in the transmission block or other mechanisms where the valve 15 is to be employed.

Preferred materials for construction of such valves should be resistant to corrosion by hydraulic fluids typically employed in automatic transmissions, yet sturdy enough to withstand the pressure under which the fluid is pumped to the cylinder.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A fast-response three-way solenoid valve, readily convertible from a normally open mode to a normally closed mode, comprising:

a housing having a first opening, a second opening, and a third opening interconnected by a linear fluid pathway, a first chamber disposed in said pathway between said first opening and said second opening, each end of said first chamber forming a first valve seat, one an inner valve seat and one an outer valve seat, with respect to said second opening, a first ball in said first chamber movable toward and away from a said first valve seat to open and to close off the flow of fluid through the pathway at said first valve seat, a second chamber disposed in said pathway in line with said first chamber and between said second opening and said third opening, each end of said second chamber forming a second valve seat, one an inner valve seat and one an outer valve seat, with respect to said second opening, a second ball in said second chamber movable toward and away from said second valve seat to open and to close off the flow of fluid through the pathway at said second valve seat, a separator pin disposed, with clearance, within said linear pathway between said first and second chambers and bearing against both said first and second balls at substantially all times, said valve seats, balls, and separator pin being so related that when one said ball is seated against its seat the other ball is away from its seat, a solenoid having a coil, a plunger which moves upon energization of the solenoid, and a guide passage between said plunger and said first chamber, aligned with both said first and second chambers and said first and second balls, a plunger pin disposed in said guide passage, one end of said plunger pin bearing against said first ball on the side thereof opposite to said separator pin, the other end of said plunger pin bearing against said plunger when said solenoid is energized, movement of said plunger upon the energization of said solenoid causing said plunger to contact and move said plunger pin, in turn moving said first ball, said separator pin, and said second ball so that one of said balls is seated when the solenoid is energized and the other ball is seated when the solenoid is de-energized, the lengths of said plunger pin and said separator pin determining whether said balls are moved between said first and second outer valve seats in a normally open mode of said valve or between said first and second inner valve seat in a normally closed mode of said valve, whereby said valve is converted from one mode to the other merely by replacement of said pins.

2. A fast-response three-way solenoid valve readily adaptable to normally open and normally closed forms comprising:

a solenoid having a coil and a plunger which moves upon energization of said solenoid, a first valve body section disposed adjacent to the side of said solenoid toward which said plunger moves upon energization of said solenoid, said first valve body section having a first central axial passage therethrough, said passage being widened at the end of said first body section farthest from said solenoid, to provide part of a first ball valve chamber, a second valve body section, disposed adjacent to and press fit together with said first valve body section, said second body section having a second central axial passage therethrough in line with the axial passage in said first valve body section, said second axial passage being widened at both ends thereby forming the remaining portion of said first ball valve chamber and part of a second ball valve chamber, a third valve body section, disposed adjacent to and press fit together with said second valve body section, said third body section having a third central axial passage therethrough in line with said axial passage in said second body section, said third axial passage being widened at the end of said third body section adjacent to said second body section, said widening forming the remaining portion of said second ball valve chamber, a pair of balls, one said ball being movably disposed in each of said ball valve chambers, a separator pin disposed in said second central axial passage, one end of said separator pin bearing against said first ball, the other end of said separator pin bearing against said second ball, one said ball being in sealing contact in its chamber, while the other said ball enables fluid passage through its chamber, and vice versa, three openings leading out from said central axial passage, the first said opening being on the first valve body section side of said first ball valve chamber, the second said opening being disposed between said ball valve chambers, and the third said opening disposed on the third valve body section side of said second ball valve chambers, a plunger pin extending between said solenoid plunger and said first ball valve chamber, bearing against the ball in said first ball valve chamber so that upon energization of said solenoid, the motion of said solenoid plunger will move said plunger pin, in turn moving said balls so that the ball in sealing contact in its chamber is moved away from such sealing contact.

3. The fast-response three-way solenoid valve of claim 2 wherein said valve is normally open, said second ball being held away from sealing contact with the end of said second chamber when said solenoid is de-energized, thereby normally permitting flow between said third opening and said second opening.

4. The fast-response three-way solenoid valve of claim 2 wherein said valve is normally closed, said second ball being held in sealing contact with said second ball valve chamber when said solenoid is de-energized, thereby normally prohibiting flow between said third opening and said second opening.

5. The fast-response three-way solenoid valve of claim 2 wherein:
said balls sealingly rest against the second valve body section ends of said chambers in the normally closed valve form,
said balls sealingly rest against the first and third valve body section ends of said chambers in the normally open valve form, and
the separator pin in said normally open valve form is longer than the separator pin in said normally closed valve form.

6. The fast-response three-way solenoid valve of claim 2 wherein:
said axial passage widenings comprise a central section and an end section,
said central sections being parallel to said axial passage and having a greater diameter than said axial passage,
said end sections being frustoconical and extending between said central sections and said axial passage, said end sections each being adapted as a valve seat for sealing engagement with the ball disposed in said ball valve chambers.

7. The fast-response three-way solenoid valve of claim 2 wherein:
said solenoid has an annular extension on the side nearest said first valve body section, said annular extension having internal threading,
said second valve body section having external threading reciprocal with said annular extension internal threading,
said assembled press-fit body sections being connected to said solenoid by screwing together said reciprocal threadings.

8. The fast-response three-way solenoid valve of claim 7 wherein:
said annular extension has external threading which corresponds with reciprocal internal threading about the opening into which said valve is to be attached.

9. The fast-response three-way solenoid valve of claim 7 wherein said second valve body section has an external surface channel connecting said first opening with the outside of said valve, past said solenoid annular extension.

10. The fast-response three-way solenoid valve of claim 9 wherein said external surface channel is a flattening of the threaded area of said second valve body section.

11. The fast-response three-way solenoid valve of claim 2 wherein:
said solenoid has internal threading on a portion of the solenoid housing on the side nearest said first valve body section,
said valve further comprising a mounting cap disposed between said solenoid and said first body section, said mounting cap having external threading reciprocal with said solenoid's internal threading,
said mounting cap having an annular extension on the side nearest said first valve body section, said mounting cap annular extension having internal threading,
said second valve body section having external threading reciprocal with said mounting cap annular extension internal threading,
said assembled press-fit body sections being connected to said mounting cap by screwing together said reciprocal threadings.

12. The fast-response three-way solenoid valve of claim 11 wherein:
said mounting cap annular extension has external threading which corresponds with reciprocal internal threading about the opening into which said valve is to be attached.

13. The fast-response three-way solenoid valve of claim 11 wherein:
said mounting cap has an external recess at its side adjacent said solenoid and a gasket of compliant material within said recess for adjusting the space between said mounting cap and said solenoid.

14. The fast-response three-way solenoid valve of claim 13 wherein said gasket of compliant material is an O-ring.

15. The fast-response three-way solenoid valve of claim 13 wherein:
said coil is disposed on a coil spool extending between the end of said solenoid farthest from the mounting cap and said mounting cap,
said recess and compliant material being disposed between said coil spool and said mounting cap.

16. The fast-response three-way solenoid valve of claim 15 wherein:
said solenoid has a plunger spacer disposed between said plunger and said coil spool,
a plunger pin guide block received in central axial openings in said mounting cap and said coil spool, said block having an axial opening defining a guide passage therethrough for said plunger pin,
said plunger spacer extending from the end of said solenoid farthest from said mounting cap to the end of said plunger pin guide block which is received in said coil spool, the portion of said plunger spacer which extends beyond said plunger defining an air gap between said plunger and said plunger pin guide block into which said plunger pin is received when said solenoid is de-energized, and into which said plunger moves upon energization,
said recess and compliant material being disposed between said coil spool, said mounting cap, and said plunger pin guide block.

17. The fast-response three-way solenoid valve of claim 11 wherein:

said solenoid has a plunger spacer disposed between said plunger and said coil, and a plunger pin guide block received in central axial openings in said mounting cap and said coil, having an axial guide passage for said plunger pin therethrough, said plunger spacer defining an air gap between said plunger and said guide passage into which said plunger pin is received when said solenoid is de-energized, and into which said plunger moves upon energization.

18. The fast-response three-way solenoid valve of claim 2 wherein said second and third valve body sections each have an external groove and an O-ring disposed in said external groove for external sealing of said valve.

19. A fast-response three-way solenoid valve, comprising:

a housing having a first opening, a secnd opening, and a third opening interconnected by a linear fluid pathway, a first chamber disposed in said pathway between said first opening and said second opening, each end of said first chamber forming a first valve seat, one an inner valve seat and one an outer valve seat, with respect to said second opening, a first ball in said first chamber movable toward and away from a said first valve seat to open and to close off the flow of fluid through the pathway at said first valve seat, a second chamber disposed in said pathway in line with said first chamber and between said second opening and said third opening, each end of said second chamber forming a second valve seat, one an inner valve seat and one an outer valve seat, with respect to said second opening, a second ball in said second chamber movable toward and away from a said second valve seat to open and to close off the flow of fluid through the pathway at that said second valve seat, a separator pin disposed, with clearance, within said linear pathway between said first and second chambers and bearing against both said first and second balls at substantially all times, said valve seats, balls, and separator pin being so related that when one said ball is seated against its said seat the other ball is not seated by said separator pin, a solenoid having a coil, a plunger which moves upon energization of the solenoid, and a guide passage between said plunger and said first chamber, aligned with both said first and second chambers and said first and second balls, a plunger pin disposed in said guide passage, one end of said plunger pin bearing against said first ball on the side thereof opposite to said separator pin, the other end of said plunger pin bearing against said plunger when said solenoid is energized, movement of said plunger upon the energization of said solenoid causing said plunger to contact and move said plunger pin, in turn moving said first ball, said separator pin, and said second ball so that one of said balls is seated against the said seat when the solenoid is energized and the other ball is seated against its said seat when the solenoid is de-energized.

20. The fast-response three-way solenoid valve of claim 19 wherein said second ball is held away from sealing contact with the inner second valve seat when said solenoid is de-energized.

21. The fast-response three-way solenoid valve of claim 19 wherein said second ball is held in sealing contact with the inner said second valve seat when said solenoid is de-energized.

* * * * *